Sept. 22, 1970          G. E. MAYS          3,529,683
                     DRILL BIT LUBRICATOR
Filed July 8, 1969                          2 Sheets-Sheet 1
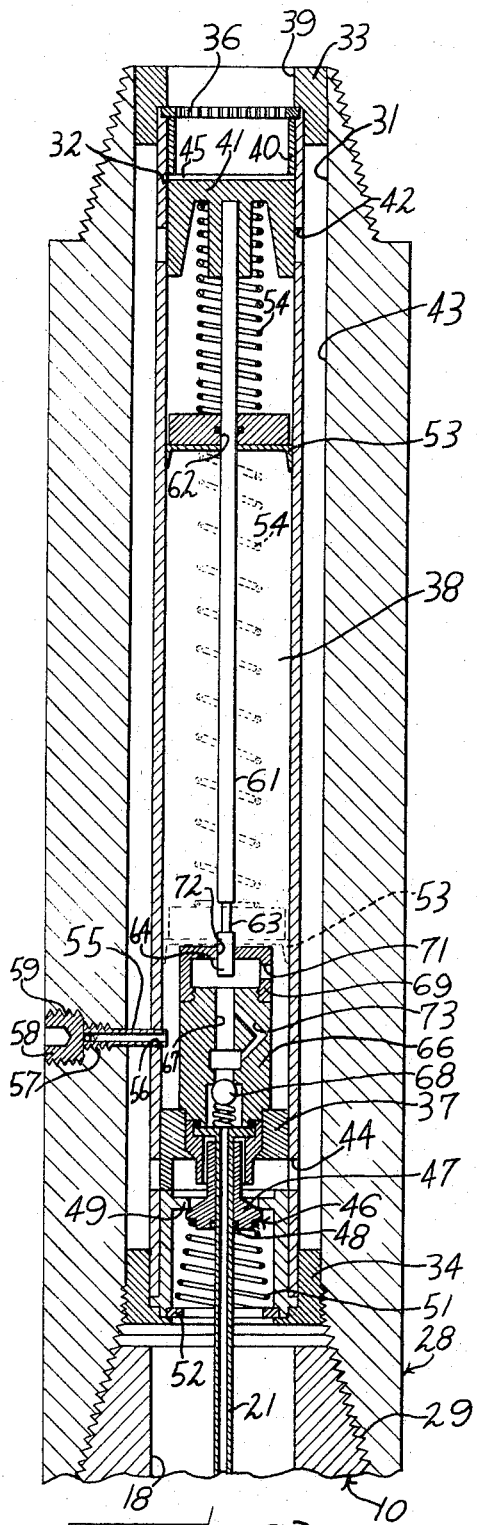
Fig 1.a
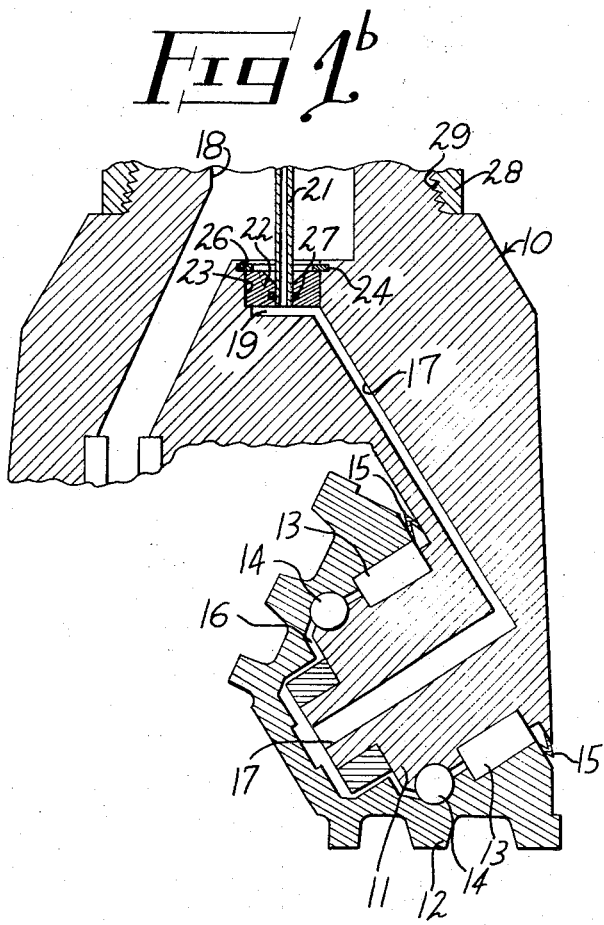
Fig 1.b
INVENTOR.
Gordon E. Mays
BY
Jennings, Carter & Thompson
Attorneys

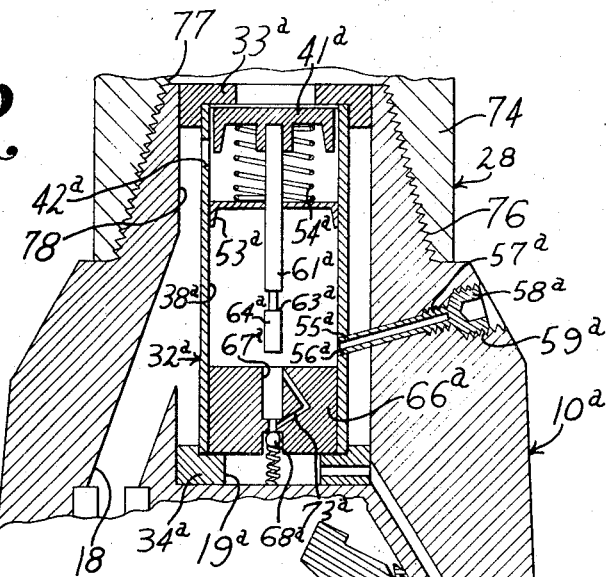
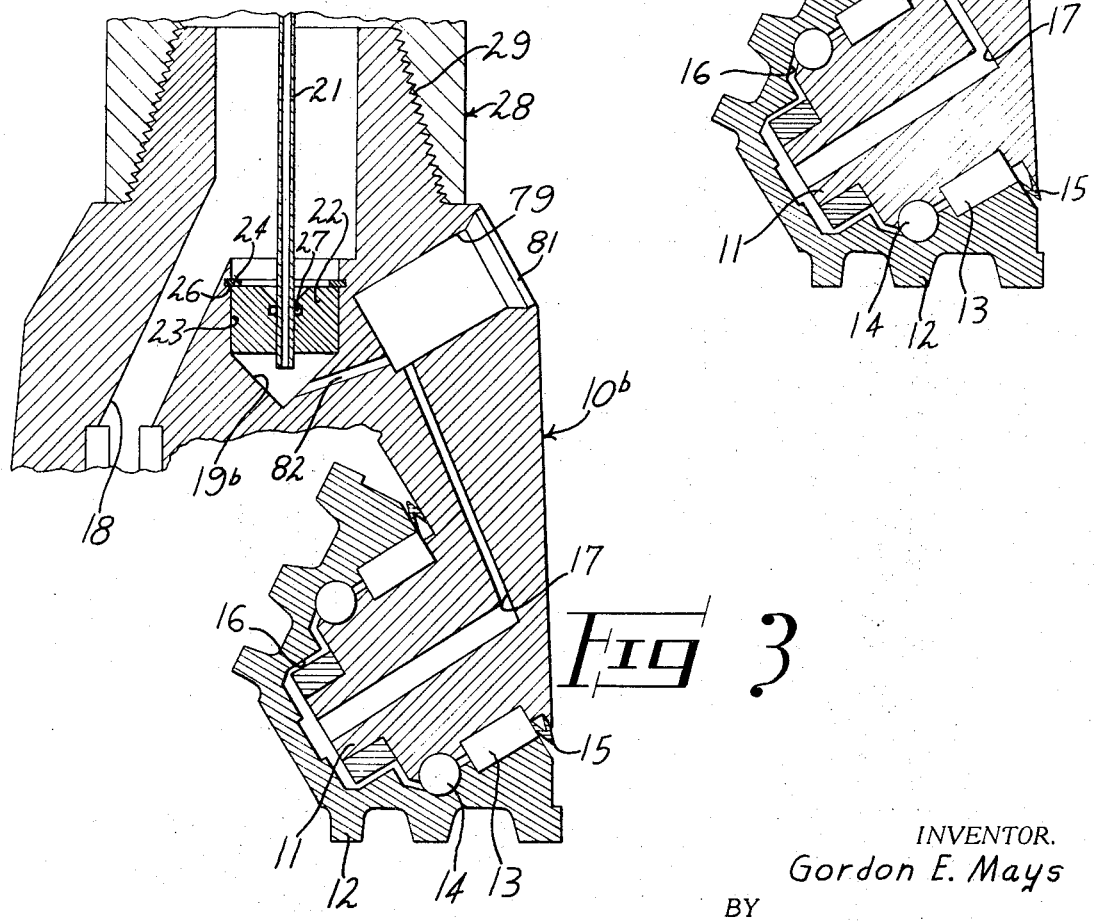

United States Patent Office 3,529,683
Patented Sept. 22, 1970

3,529,683
DRILL BIT LUBRICATOR
Gordon E. Mays, 245 27th Court NW.,
Birmingham, Ala. 35215
Filed July 8, 1969, Ser. No. 839,817
Int. Cl. E21b 9/08
U.S. Cl. 175—228      10 Claims

ABSTRACT OF THE DISCLOSURE

Bit lubricator embodying first chamber communicating at upper end with circulation fluid passageway with first piston mounted therein and movable by circulation fluid until first piston moves past fluid by-pass opening in first chamber. Upon release of pressure of circulation fluid first piston returns to original position. Second piston in first chamber forces subjacent lubricant in first chamber into second chamber carried by lower portion of first chamber. Third piston in second chamber forces lubricant from second chamber each time first piston moved by pressure of circulation fluid. Discharge end of second chamber communicates with space between rotary cutter and its support.

BACKGROUND OF THE INVENTION

This invention relates to a bit lubricator and more particularly to apparatus for lubricating bearings of roller type bits wherein the lubricant is positively applied to the roller bearings used in such bits.

As is well known in the art to which my invention relates, difficulties have been encountered in applying lubricant in a positive manner in the space between the rotary cutter elements and their supporting means due to the fact that the rotary bit and any lubricating means therefor is located well below the surface during the drilling operation whereby lubricant cannot be easily applied to the bit unit. Many lubricating devices have been proposed for lubricating the bearing assemblies of rotary drill bits, such as by providing lubricant reservoirs within the drill bits. The operation of these devices depend upon a pressure differential between the bearing space within the bit roller and the outside annulus of the bore hole surrounding the bit. Since this pressure differential is very small, there can be no positive lubrication of the roller bearing with this type assembly, even with the additional use of spring means for urging the lubricant into the bearing areas of the drill bit. The patent to Bercaru No. 3,303,898, dated Feb. 14, 1967 discloses such prior art apparatus which has heretofore been employed.

BRIEF SUMMARY OF THE INVENTION

In accordance with my invention, I provide positive means for lubricating the bearing areas of a rotary drill bit each time the circulation fluid is introduced under pressure into the drill assembly whereby the bearings of the bit are automatically lubricated each time the flow of circulation fluid, such as air, is interrupted and then commenced again. The bearings may thus be lubricated more frequently by merely interrupting the flow of circulation fluid and then commencing the flow each time it is desired to apply a positive amount of lubricant to the bearing area.

My improved bit lubricator is adapted for installation on conventional type drill units as well as on drill units designed specifically for my improved lubricator with a minimum of change in the structure of the conventional type drill unit. Also, by providing positive means for lubricating the bearing areas I not only greatly increase the life of the bearings but make it practical to use tungsten-carbide insert button, roller-type bits or other hard surface bits due to the fact that premature failure of roller bearings has been a great factor in decisions regarding the use of such bits in the past.

Apparatus embodying features of my invention is illustrated in the accompanying drawings, forming a part of this application, in which:

FIGS. 1a and 1b, collectively, are vertical sectional views through a well drilling bit connected to a sub-assembly with the bit being lubricated by my improved lubricator;

FIG. 2 is a vertical sectional view showing a modified form of my invention wherein the means for lubricating the bit is mounted within the bit body; and FIG. 3 is a vertical sectional view showing a further modified form of my inventon wherein a conventional type lubricated drill bit is supplied with lubricant by my improved lubricator.

Referring now to the drawings for a better understanding of my invention, I show a drill bit body 10 which is provided with the usual bearing pins 11 for supporting rotary cutters 12. As shown in 1b, each rotary cutter 12 is supported on the bearing pin 11 by roller bearings 13 and ball bearings 14 in a manner well understood in the art to which my invention relates. The usual space 16 is provided between the rotary cutters and their bearing pins 11 whereby lubricant is free to move between the bearing pin 11 and its rotary cutter. A lubricating passageway 17 is provided in each bearing pin 11 for introducing lubricant into the space 16 whereby the bearings 13 and 14 are lubricated. The bit body 10 is provided with the usual passageway 18 therethrough for introducing a circulation fluid, such as air under pressure, mud or the like for flushing the hole being bored of cuttings in a manner well understood in the art.

The upper end of each lubricating passageway 17 communicates with a cavity 19 which in turn communicates with the lower end of a lubricant supply conduit 21. An annular member 22 surrounds the lower end of the lubricant supply conduit 21 and engages with a press fit an opening 23 provided in the bit body 10. A retainer ring 24 fits within a recess 26 to prevent outward movement of the annular member 22. Also, a suitable seal, such as an O-ring 27, is interposed between the outer surface of conduit 21 and the annular member 22 to form a seal therebetween. The upper end of the bit body 10 is threadedly connected to a sub-assembly 28 by a threaded joint 29. The sub-assembly 28 is provided with a cylindrical opening 31 therethrough, as shown. Extending through opening 31 is a tube-like member 32 which is held in spaced relation to the inner surface of opening 31 by upper and lower retainer rings 33 and 34, respectively. A suitable screen element 36 extends across the upper end of tube-like member 32 to prevent the entry of large particle size materials into the tube-like member 32. If desired, the further addition of a conventional metal wool type filter may be used in connection herewith to arrest the smaller size particles. A suitable recess is provided in the upper end of the tube-like member 32 for receiving the screen 36.

As shown in FIG. 1a, an annular member 37 extends transversely of a lower portion of the tube-like member 32 to form a seal therewith and define a first chamber 38 above the annular member 37. The upper end of the chamber 38 communicates with the usual circulation fluid passageway 39 provided in the upper portion of sub-assembly 28.

Mounted for sliding movement in the upper portion of the chamber 38 is a first piston 41 which is adapted to move from a first position adjacent a stop member 40 to a position below a lateral passageway 42 provided in the side wall of the tube-like member 32. A suitable flexible disc 45 provides a seal between piston 41 and tube-like member 32. Upon movement of the piston 41 below the passageway 42, the circulation fluid, such as air, mud or the like, by-passes the first chamber 38 and enters an annular passageway 43 defined between the outer surface of tube-like member 32 and the inner surface 31 of sub-assembly 28. Preferably, a plurality of passageways 42 are provided, as shown. A second passageway 44 is provided in the tube-like member 32 below the annular member 37, as shown in FIG. 1a, whereby the circulation fluid re-enters the tube-like member 32 beneath the first chamber 38 whereupon it then passes downwardly through the circulation fluid passageway 18 provided in the bit body 10.

A suitable check valve assembly 46 is provided in the tube-like member 32 beneath the passageway 44 to prevent upward movement of the circulation fluid. The check valve 46 comprises a movable member 47 which is adapted for sliding movement along conduit 21. A suitable seal 48 is provided between the movable member 47 and the conduit 21, as shown. The movable member 47 is provided with a downwardly sloping conical surface which is adapted to engage an inwardly projecting annular flange 49 to seal the lower end of the tube-like member 32 against upward flow of circulation fluid. A compression spring 51 is interposed between the lower end of movable member 47 and a lower locking ring 52 provided adjacent the lower end of tube-like member 32 whereby the movable member 47 is urged upwardly into engagement with the inner edge of annular flange 49.

Mounted for sliding movement in the chamber 38 beneath the piston 41 is a second piston 53 which is urged downwardly away from piston 41 by a compression spring 54. Communicating with the chamber 38 between the piston 53 and the annular member 37 is a lubricant supply conduit 55 which extends through an opening 56 provided in the tubular member 32. The outer end of the lubricant supply conduit 55 extends into and is connected to a threaded opening 57 provided in the sub-assembly 28. The outer end of the conduit 55 is closed by a plug 58 which threadedly engages an opening 59 provided in the sub-assembly, as shown. Lubricant is introduced into the conduit 55 under pressure whereby the compression spring 54 is compressed as the lower piston 53 is moved upwardly toward the first piston 41. The compression spring 54 thus serves a double function in that it urges the lower piston 53 downwardly to exert a constant pressure against the lubricant in chamber 38 and at the same time exerts an upward force on the upper piston 41 whereupon it is returned to its uppermost position upon interruption of the supply of circulation fluid. through opening 39. That is, upon introduction of the circulation fluid into opening 39, piston 41 moves downwardly until it passes the lateral passageway 42 whereupon the fluid is then by-passed through the annular passageway 43 through opening 44 and check valve 46 to the passageway 18 in the bit body. The piston 41 then remains in the position beneath the passageway 42 until the flow of the circulation fluid is interrupted whereupon the spring 54 then urges the piston 41 to its uppermost or original position.

Secured to the undersurface of the first piston 41 is a depending rod-like member 61 which extends through a suitable opening 62 provided in the piston unit 53, as shown in FIG. 1a. An annular recess 63 is provided in spaced relation to the lower end of rod-like member 61 for a purpose to be described hereinafter to thus define a third piston 64 at the lower end of rod-like member 61.

Mounted within the tube-like member 32 at the upper side of annular member 37 is an annular housing 66 having a centrally disposed chamber 67 therein which is adapted to receive the piston 64 with a sliding fit. The lower end of chamber 67 communicates with the upper end of the lubricant supply conduit 21. A check valve 68 is provided in the lower end of chamber 67 to prevent upward flow of lubricant into the lower end of chamber 67. Secured to the upper end of annular housing 66 is a downwardly opening cup-like member 69 having a passageway 71 therethrough for conveying lubricant from chamber 38 into the upper end of chamber 67. A centrally disposed opening 72 is provided in the upper wall of cup-like member 69 to serve as a guide for the piston 64 whereby it moves into the chamber 67 upon downward movement of rod-like member 61 and piston 41.

It will thus be seen that each time the piston 64 is urged upwardly by the spring 54, lubricant moves from chamber 38 through passageway 71 into the chamber 67. Upon introducing circulation fluid again into the opening 39, piston 41 moves downwardly thus imparting downward movement to piston 64 whereupon piston 64 forces lubricant from chamber 67 into supply conduit 21. The volume of lubricant discharged into conduit 21 may be varied by varying the diameter of the piston 64 and chamber 67. The lubricant forced from the lower end of conduit 21 forces lubricant through passageway 17 whereupon the lubricant is forced into the space 16 to thus lubricate the bearings 13 and 14. A suitable annular seal 15 is provided between the rotary cutter 12 and the bit body to restrain flow of lubricant from the cavity or space 16 until additional supply of lubricant is forced inwardly of the cavity through passageway 17. Accordingly, each time the piston 64 moves downwardly to force lubricant from the lower end of chamber 67, lubricant is positively forced into the bearing area of the bit to supply lubricant thereto and when excess lubricant is forced into the cavity 16 old lubricant is forced outwardly by the seals 15 to thus assure that a fresh quantity of lubricant is supplied to the cavity 16 each time the piston 64 moves downwardly through chamber 67 in response to introduction of fluid under pressure through passageway 39.

Upon movement of the first piston 41 past the passageway 42 to divert the compressed fluid, such as air, through passageway 42, the pressure exerted against the piston 41 is dropped slightly which causes the piston 64 to react upward against the lower air pressure, resulting in a slight bouncing or chatter. To prevent this chatter, I provide a passageway 73 in the housing 66 which communicates at its lower end with the lower end of chamber 67. The upper end of passageway 73 communicates with chamber 67 above the piston 64 while piston 64 is in its lowermost position. The upper end of passageway 73 is in position to communicate with the annular recess 63 upon movement of the piston 64 to its lowermost position whereby the lower portion of chamber 67 communicates directly with the chamber 38 upon movement of the piston 64 to a position to align recess 63 with passageway 73. By so doing upward force is removed from piston 64, rod 61 and piston 41 thereby reducing the upward force of these members against the lowered fluid pressure in passage 39. This action reduces the tendency of these parts to chatter or bounce.

Referring now to FIG. 2 of the drawings, I show another form of my invention in which the entire lubricating assembly is mounted within the drill bit body 10a. The bit body 10a is provided with the usual bearing pin 11 and rotary cutter 12 which is mounted for rotation on bearings 13 and 14 as described hereinabove. An annular seal 15 is provided between the rotary cutter and the bit body and the cavity or space 16 is provided between the rotary cutter 12 and the bearing pin 11 to permit flow of lubricant from the passageway 17 as described above. Also, the usual circulation fluid passageway 18 is provided through the bit body 10a.

The upper end of the bit body 10a is threadedly connected to the lower end of a drill string 74 a threaded joint 76. The usual circulation fluid passageway 77 is provided in the drill string 74 for supplying a fluid under pressure, such as air, mud or the like for flushing the hole being bored of cuttings.

A centrally disposed opening 78 is provided in the drill bit body 10a with the lower end thereof communicating with the circulation fluid passageway 18. Mounted within the opening 78 in spaced relation to the inner surface thereof is a tube-like member 32a which is held in spaced relation to the opening 78 by upper and lower retainer rings 33a and 34a, respectively. The retainer rings 33a and 34a also define seals between the upper and lower ends, respectively of the tubular member 32a and the bit body 10a.

The upper portion of the tube-like member 32a defines a first chamber 38a which slideably receives vertically spaced pistons 41a and 53a. A compression spring 54a is interposed between the pistons 41a and 53a whereby the piston 41a is urged upwardly and the lower piston 53a is urged downwardly. A lateral passageway 42a is provided through the tubular member 32a for by-passing circulation fluid upon movement of the piston 41a beneath the passageway 42a, as described hereinabove relative to the embodiment shown in FIGS. 1a and 1b. Lubricant is supplied to the chamber 38a by a lubricant supply conduit 55a which extends through an opening 56a provided in the tubular member 32a. The outer end of the conduit 55a extends into and is threadedly connected to the bit body 10a by threads 57a. A removable plug 58a is threadedly connected at 59a to the bit body 10a to close the outer end of lubricant supply conduit 55a. Lubricant is supplied to the chamber 38a under pressure whereby the spring 54a is compressed as piston 53a is moved to its uppermost position whereby a constant force is exerted against the lubricant in chamber 38a.

An annular recess is provided in a depending rod-like member 61a which is connected to the piston 41a for movement therewith. The lower end of the rod-like member 61a defines a piston 64a which is adapted to move inwardly of chamber 67a provided in an annular housing 66a. The upper end of chamber 67a communicates with the chamber 38a while the lower end thereof communicates with a cavity 19a which in turn communicates with lubricant supply passageways 17 for supplying lubricant thereto. A check valve 68a is provided in the lower portion of chamber 67a to prevent upward flow of lubricant therethrough.

A passageway 73a is provided in the housing 66a in position to communicate the lower portion of chamber 67a with the chamber 68a upon movement of the piston 64a to its lowermost position. While piston 64a is in its lowermost position, the annular recess 63a communicates with the upper end of passageway 73a to thus communicate both sides of piston 64a with the chambers 38a to thereby prevent chatter, as described above.

From the foregoing description, the operation of the apparatus shown in FIGS. 1a, 1b and 2 will be readily understood. Each time circulation fluid is introduced under pressure through openings 39 or 77, as the case may be, the piston 41 or 41a is forced downwardly to thus force piston 64 or 64a into cylinders 67 or 67a to thereby force lubricant into the passageway 17. The lubricant is thus forced into the bearing cavities 16 each time the circulation fluid is introduced into openings 39 or 77, as the case may be. After the uppermost piston 41 or 42a is forced downwardly below the passageway 42 or 43, the circulation fluid flows downwardly and by-passes the chamber 38 or 38a, as the case may be, whereupon it passes to circulation fluid passageway 18. Upon interruption of the flow of circulation fluid to the openings 39 or 77, the spring 54 or 54a returns the uppermost piston 41 or 41a to its original position whereupon the spring pressure on lowermost piston 53 or 53a then refills the chamber 67 or 67a with lubricant whereby the apparatus is in position for another cycle of operation upon again introducing circulation fluid. Interruption of the flow of circulation fluid occurs as of necessity upon completion of bore hole or with each drill pipe change. Also, this interruption may occur more frequently if desired by stopping and restarting fluid flow. It will thus be seen that lubricant is positively supplied to the bearing cavity 16 each time the flow of circulation fluid is interrupted. If it is desired to lubricate the bit bearings more often, the operator merely interrupts the flow of circulation fluid the desired number of times whereby lubricant is forced positively from the chamber 67 or 67a. In the normal operation of the drilling apparatus, the bearings are automatically lubricated each time the drill rod sections are changed or each time the flow of circulation fluid is interrupted and again forced downwardly through the passageways 39 or 77.

Referring now to FIG. 3 of the drawings, I show a further modified form of my invention wherein a conventional type drill bit body 10b having a self-lubricating chamber 79 therein may be modified to receive lubricant from the lubricant supply circuit 21 described hereinabove relative to FIGS. 1a and 1b. The bit body 10b is provided with a bearing pin 11 which carries a rotatable cutter 12. Bearings 13 and 14 are interposed between the rotary cutter and the pin 11 and a lubricant cavity 16 is provided between the pin 11 and the cutter 12. Also, a lubricant passageway 17 communicates at its lower end with the cavity 16 while the upper end thereof communicates with the lubricant supply chamber 79.

To modify the conventional drill bit 10b having the lubricant container 79 therein, the conventional means for forcing the lubricant from the chamber 79 is removed and the outer end of chamber 79 is closed by a cover member 81. An inwardly extending passageway 82 is provided in the bit body 10a which communicates chamber 79 with a cavity 19b. The lower end of the lubricant supply conduit 21 extends downwardly through an annular member 22 which is pressed within a cavity 23, as described hereinabove relative to the structure shown in FIGS. 1a and 1b. A retainer ring 24 fits within a recess 26 whereby the member 22 is secured in place as described above. Also, a sealing ring 27 surrounds the conduit 21 to provide a seal between conduit 21 and annular member 22.

The operation of the apparatus shown in FIG. 3 is substantially identical to the operation of the apparatus shown in FIGS. 1a and 1b. That is, the lubricant supplied from the conduit 21 passes into chamber 79 and then into the lubricant supply passageway 17 whereupon lubricant is supplied to the bearing areas of the drill bit.

From the foregoing, it will be seen that I have devised an improved drill bit lubricator. By providing positive means for applying lubricant to the bearing area each time the flow of circulation fluid is commenced, the bearings are automatically lubricated during the normal operation of the drilling apparatus. Also, the bearing areas of the drill bit may be lubricated at any desired time by interrupting the flow of circulation fluid and then commencing the flow again. Furthermore, my improved apparatus is particularly adapted for use on conventional type drill bit units as well as on new equipment.

While I have shown my invention in several forms, it will be obvious to those skilled in the art that it is not so limited, but is susceptible of various other changes and modifications without departing from the spirit thereof.

What I claim is:

1. In a drilling assembly for use with a drill string having a circulation fluid passageway therethrough for receiving fluid under pressure and attachable to a bit body having means supporting a rotary cutter with a space between the cutter and its supporting means for receiving lubricant, the improvement comprising:
 (a) a first chamber communicating at one end with said circulation fluid passageway,
 (b) a first piston adapted for sliding movement in said first chamber adjacent said one end thereof,
 (c) there being a passageway through a side of said first chamber in spaced relation to said one end of said first chamber in position to communicate with said circulation fluid passageway upon movement of said piston from a first position to a second position inwardly of said one end toward the other end of said first chamber so that said circulation fluid by-passes said first chamber, (d) means returning said first piston to said first position upon interruption of the flow of fluid under pressure, (e) a second piston mounted for sliding movement in said first chamber inwardly of said first piston, (f) a second chamber having a receiving end and a discharge end with said receiving end communicating with said other end of said first chamber, (g) means introducing lubricant into said first chamber between said second piston and said second chamber, (h) means urging said second piston toward said other end of said first chamber forcing lubricant from said first chamber into said second chamber, (i) a third piston mounted for movement from a position outwardly of said second chamber to a position inwardly thereof whereby lubricant is forced by said second piston into said second chamber while said third piston is outwardly thereof and lubricant is discharged from said second chamber upon movement of said third piston inwardly thereof, and (j) means communicating the discharge end of said second chamber with said space between said cutter and its support means so that lubricant is forced from said second chamber and into said space each time third piston moves inwardly of said second chamber.

2. A drilling assembly as defined in claim 1 in which said other end of said first chamber is closed adjacent said second chamber whereby lubricant is discharged only through said second chamber.

3. A drilling assembly as defined in claim 1 in which said discharge end of said second chamber is closed by a check valve permitting discharge of lubricant.

4. A drilling assembly as defined in claim 1 in which said first chamber is defined by an upper portion of a tubular member and a second passageway is provided through a side of said tubular member below said second chamber for re-entry of said by-passed circulation fluid into said tubular member and a check valve is provided in said tubular member below said second passageway preventing upward flow of said circulation fluid and contaminants.

5. A drilling assembly as defined in claim 1 wherein the means for returning said first piston to said first position and the means for urging said second piston toward said other end of said first chamber comprises a compression spring interposed between said first and said second pistons.

6. A drilling assembly as defined in claim 1 in which the means introducing lubricant comprises, a conduit extending through a side of said first chamber intermediate said second piston and said second chamber and a removable plug closing the outer end of said conduit.

7. A drilling assembly as defined in claim 1 in which said first and second chambers are carried by a drill sub assembly connected at its upper end to a drill string and at its lower end to a drill head.

8. A drilling assembly as defined in claim 1 in which said first and second chambers are carried by a drill head.

9. A drilling assembly as defined in claim 1 in which said third piston is carried by the lower end of an actuating member which is connected at its upper end to said first piston, there being a passageway in said second chamber communicating said first chamber with said second chamber at a point below said third piston upon movement of said third piston to its lowermost position.

10. A drilling assembly as defined in claim 9 in which said actuating member is an elongated rod-like member having said third piston formed integrally at the lower end thereof, there being a recess in said rod-like member above said third piston communicating the uppermost end of said passageway in said second chamber with said first chamber.

References Cited

UNITED STATES PATENTS

| | | | |
|---|---|---|---|
| 1,501,482 | 7/1924 | Hughes | 175—228 |
| 1,641,273 | 9/1927 | Hughes | 175—228 |
| 3,017,937 | 1/1962 | Bobo | 175—228 |
| 3,029,881 | 4/1962 | Swart | 175—228 |
| 3,220,496 | 11/1965 | Beck | 175—228 |
| 3,303,898 | 2/1967 | Bercaru | 175—228 |

DAVID H. BROWN, Primary Examiner